US009010842B2

(12) United States Patent
Webster et al.

(10) Patent No.: US 9,010,842 B2
(45) Date of Patent: Apr. 21, 2015

(54) AERODYNAMIC DRAG AND NOISE REDUCTION DEVICE FOR A VEHICLE ROOF RACK ARTICLE CARRIER

(71) Applicants: Warren R. Webster, San Rafael, CA (US); Richard C. Stephens, Chicago, IL (US)

(72) Inventors: Warren R. Webster, San Rafael, CA (US); Richard C. Stephens, Chicago, IL (US)

(*) Notice: Subject to any disclaimer, the term of this patent is extended or adjusted under 35 U.S.C. 154(b) by 76 days.

(21) Appl. No.: 14/019,752

(22) Filed: Sep. 6, 2013

(65) Prior Publication Data

US 2015/0069783 A1 Mar. 12, 2015

(51) Int. Cl.
*B60J 9/00* (2006.01)
*B62D 35/00* (2006.01)
*B60R 9/05* (2006.01)

(52) U.S. Cl.
CPC .. *B62D 35/00* (2013.01); *B60R 9/05* (2013.01)

(58) Field of Classification Search
CPC ........ B62D 35/001; B62D 35/00; F15D 1/12; Y02T 50/166; B60W 10/06; B60R 9/06; B60R 9/12; B60R 9/10; B60R 9/055; B60R 9/08
USPC .......... 296/180.1, 180.2, 180.3, 180.4, 180.5, 296/181.5, 91; 211/70.5; 180/903; 294/147; 224/917.5, 917, 571, 309, 325, 324; 41/462; 280/814
See application file for complete search history.

(56) References Cited

U.S. PATENT DOCUMENTS

| | | | | |
|---|---|---|---|---|
| 4,084,735 A * | 4/1978 | Kappas | ........................ | 224/328 |
| 4,087,124 A * | 5/1978 | Wiley, Jr. | .................. | 296/180.2 |
| 4,456,158 A | 6/1984 | Wertz et al. | | |
| 4,681,247 A * | 7/1987 | Prosen | ......................... | 224/322 |
| 4,793,535 A * | 12/1988 | Johnson | ........................ | 224/329 |
| 5,456,397 A * | 10/1995 | Pedrini | ......................... | 224/324 |
| 5,490,621 A * | 2/1996 | Dixon et al. | .................. | 224/319 |
| 5,713,498 A * | 2/1998 | Cucci | ............................ | 224/328 |
| 5,769,291 A * | 6/1998 | Chasan | ......................... | 224/324 |
| 5,848,743 A * | 12/1998 | Derecktor | ..................... | 224/331 |
| 6,385,822 B1 * | 5/2002 | Dean et al. | ........................ | 24/633 |
| 6,419,134 B1 * | 7/2002 | Grimm et al. | ................. | 224/331 |
| 6,827,245 B1 * | 12/2004 | Yetka | ............................ | 224/316 |
| 7,258,260 B2 * | 8/2007 | Hurd | ............................. | 224/319 |
| 8,136,709 B2 * | 3/2012 | Jeli et al. | ....................... | 224/323 |
| 8,496,285 B2 * | 7/2013 | Rogers et al. | .............. | 296/180.1 |
| 8,517,237 B1 * | 8/2013 | Barber | .......................... | 224/316 |
| 8,534,516 B1 * | 9/2013 | Vo | ................................. | 224/318 |
| 8,905,279 B2 * | 12/2014 | Hubbard et al. | .............. | 224/328 |
| 2001/0042766 A1 * | 11/2001 | Ming-Shun | ................... | 224/324 |

(Continued)

OTHER PUBLICATIONS

"Aerodynamics of Vehicle Add-Ons," ICME09-FM-27, Alam, et al. (2009).

*Primary Examiner* — Kiran B Patel (57) ABSTRACT

Proposed is an aerodynamic drag and noise reduction device for a vehicle roof rack, particularly ski rack. The device comprises an add-on aerodynamic drag and noise reduction device in the form of a hollow parabolic-shaped container having a smoothly rounded closed front or leading side, an interior portion accessed from the rear side of the device for accommodating an object such as a ski rack in order to reduce aerodynamic drag and noise generated while the vehicle to which it is attached is in motion, and to protect the object, e.g. ski rack, from the elements whether the vehicle to which it is attached is in motion or not, and a mechanism for mounting and securing the disclosed device to the article carrier, e.g. ski rack. The front closed side of the device can be used for carrying graphic information such as advertisement, logo, or the like.

19 Claims, 7 Drawing Sheets

(56) References Cited

U.S. PATENT DOCUMENTS

| | | |
|---|---|---|
| 2003/0080166 A1* | 5/2003 | De los Cobos ............... 224/319 |
| 2006/0041448 A1* | 2/2006 | Patterson et al. ................. 705/1 |
| 2006/0273122 A1* | 12/2006 | Bogoslofski et al. ......... 224/324 |
| 2006/0273123 A1* | 12/2006 | Settelmayer .................. 224/325 |
| 2007/0114256 A1* | 5/2007 | Rodden et al. ................ 224/328 |
| 2007/0181622 A1* | 8/2007 | Rocchio ........................ 224/324 |
| 2007/0205240 A1* | 9/2007 | Castro et al. .................. 224/328 |
| 2009/0256697 A1* | 10/2009 | Tallinger ....................... 340/472 |
| 2009/0308902 A1* | 12/2009 | Rex ................................ 224/315 |
| 2010/0078454 A1* | 4/2010 | Sautter et al. ................. 224/315 |
| 2011/0079621 A1 | 4/2011 | Byers et al. |
| 2013/0088040 A1* | 4/2013 | Pfaff ........................... 296/180.4 |
| 2013/0193175 A1* | 8/2013 | Ward et al. .................... 224/309 |
| 2014/0373409 A1* | 12/2014 | Blanks et al. .................. 40/592 |

* cited by examiner

AERODYNAMIC DRAG AND NOISE REDUCTION DEVICE FOR A VEHICLE ROOF RACK ARTICLE CARRIER

BACKGROUND

1. Field of the Invention

The proposed device relates to an aerodynamic drag and noise reduction devices for vehicle roof racks, in particularly for use with assemblies for carrying articles on a vehicle's roof rack. e.g. a ski rack. More specifically, the proposed device is aimed at aerodynamic, sonic, and aesthetic improvements, and physical protection for roof mounted ski and/or snowboard article carriers, as well as to providing a platform for logos, brand names or other graphic designs.

2. Description of Prior Art

Many ski rack attachments or units, i.e., the articles that affix to a vehicle's roof cross bars or roof rack system to hold skis and/or snowboards ("ski racks"), have an essentially vertical forward facing presentation on the top of a vehicle. A single ski rack unit generally consists of two elongated rigid portions with a hinge device at one end and a latch device at the other, activated by an actuator device, such as a depressible pad or button. Flexible gripping strips, made of rubber or similar material, are affixed to the interfacing surfaces of the elongated rigid portions. There are two such identical units, one affixed to the forward cross bar and the other to the rear cross bar. Skis and/or snowboards are secured by placing them between the flexible gripping strips of both parts and employing the latching devices. Whether ski racks are being used to transport skis and/or snowboards or not, the ski racks present with a non-uniform, multi-component surface comprised of various materials. Ski racks may also present with gaps or channels, such as between the flexible gripping strips, through which air may pass.

While a vehicle with roof mounted ski racks is in forward motion, whether carrying skis and/or snowboards or not, the ski rack's front facing profile, particularly on the forward ski rack, is exposed to airflow and environmental elements. The exposed ski rack increases aerodynamic drag on the vehicle resulting in decreased fuel efficiency and various airflow disturbances caused by the exposed ski rack increases noise, often including whistling, and buffeting. The exposed orientation of the ski rack also leaves the ski rack susceptible to damage from flying road debris and the elements.

Published studies such as "Aerodynamics of Vehicle Add-Ons," ICME09-FM-27, Alam, et al. (2009) reveal that more than 80% of a vehicle's power is required to overcome aerodynamic drag and that roof rack components, like ski racks, can increase aerodynamic drag from 5-20% at driving speeds between 37 and 75 MPH. Studies, such as the aforementioned study, also reveal that with increased drag comes decreased fuel efficiency and subsequent higher annual fuel costs to consumers, increased carbon dioxide emissions, and increased noise generation that is disruptive to vehicle passengers.

In addition, many consumers also tend to leave their ski racks mounted to their vehicles even when not transporting skis or snowboards as removal and reattachment of ski racks, and other roof rack article carriers, between uses may not be convenient or desirable.

Finally, simple aerodynamic fairings, generally planar plastic parts that attach are sometimes employed in front of the forward cross bar, providing an angled surface for wind deflection from the roof line over the forward cross bar, or a portion of it. While these devices may reduce aerodynamic drag and noise generation with respect to cross bars depending on configuration, they also tend to direct airflow directly into the forward presenting portion of a roof rack article carrier, e.g. a ski rack, thus increasing the aerodynamic drag associated with that article carrier. e.g., ski rack.

Attempts have been made heretofore to reduce the aerodynamic drag created by vehicle roof mounted article carriers such as ski racks, bicycle racks, etc.

U.S. Pat. No. 4,456,158 issued on Jun. 26, 1984 to K. Wertz, et al. discloses a "wind deflector" for a scissors-type ski rack. The wind deflector portion is oriented in the front portion of the ski rack unit, and is secured to the ski rack unit by an integral T-shaped component that is clamped down between the flexible gripping strips. The wind deflector is a single extruded piece with tapered end caps.

US Patent Application Publication 2011/0079621 A1 (Published on Apr. 7, 2011; inventors: W. Byers, et al.) discloses a pivoting frame for various article carrying platforms, including diagonal ski racks. This application also discloses an optional simple fairing that mounts to the frame of the article carrier.

U.S. Pat. No. 6,827,245 B1 issued on Dec. 7, 2004 to C. Yetka discloses an aerodynamic container for use on the front portion of skis or snowboards when the skis or snowboards are clamped into a vehicle's ski rack.

However, none of the known prior art devices of which the applicants are aware exists for providing efficient reduction of aerodynamic drag and noise generated by horizontal scissor-type ski racks simultaneously with improvement in aerodynamic performance and protection of ski racks from environmental damage.

Therefore, there exists a need for an apparatus that is lightweight, easily attachable and removable, which is capable of reducing aerodynamic drag, reducing noise, and enveloping and protecting roof rack mounted article carriers, like ski racks.

SUMMARY

The disclosure relates to an aerodynamic drag and noise reduction device for a vehicle roof rack, in particularly for use with assemblies for carrying articles on a vehicle's roof rack, such as a ski rack. More specifically, the proposed device is aimed at aerodynamic, sonic, and aesthetic improvements, and physical protection for roof mounted ski and snowboard article carriers, as well as for providing a platform for logos, brand names or other graphic designs.

The proposed device comprises an add-on aerodynamic drag and noise reduction device in the form of a hollow parabolic-shaped container having a smoothly rounded closed front or leading side, an interior portion accessed from the rear side of the device for accommodating an object such as a ski rack in order to reduce aerodynamic drag and noise generated while the vehicle to which it is attached is in motion, and to protect the object, e.g. ski rack, from the elements whether the vehicle to which it is attached is in motion or not, and a mechanism for mounting and securing the disclosed device to the article carrier, e.g., ski rack.

DETAILED DESCRIPTION

Figure 1:
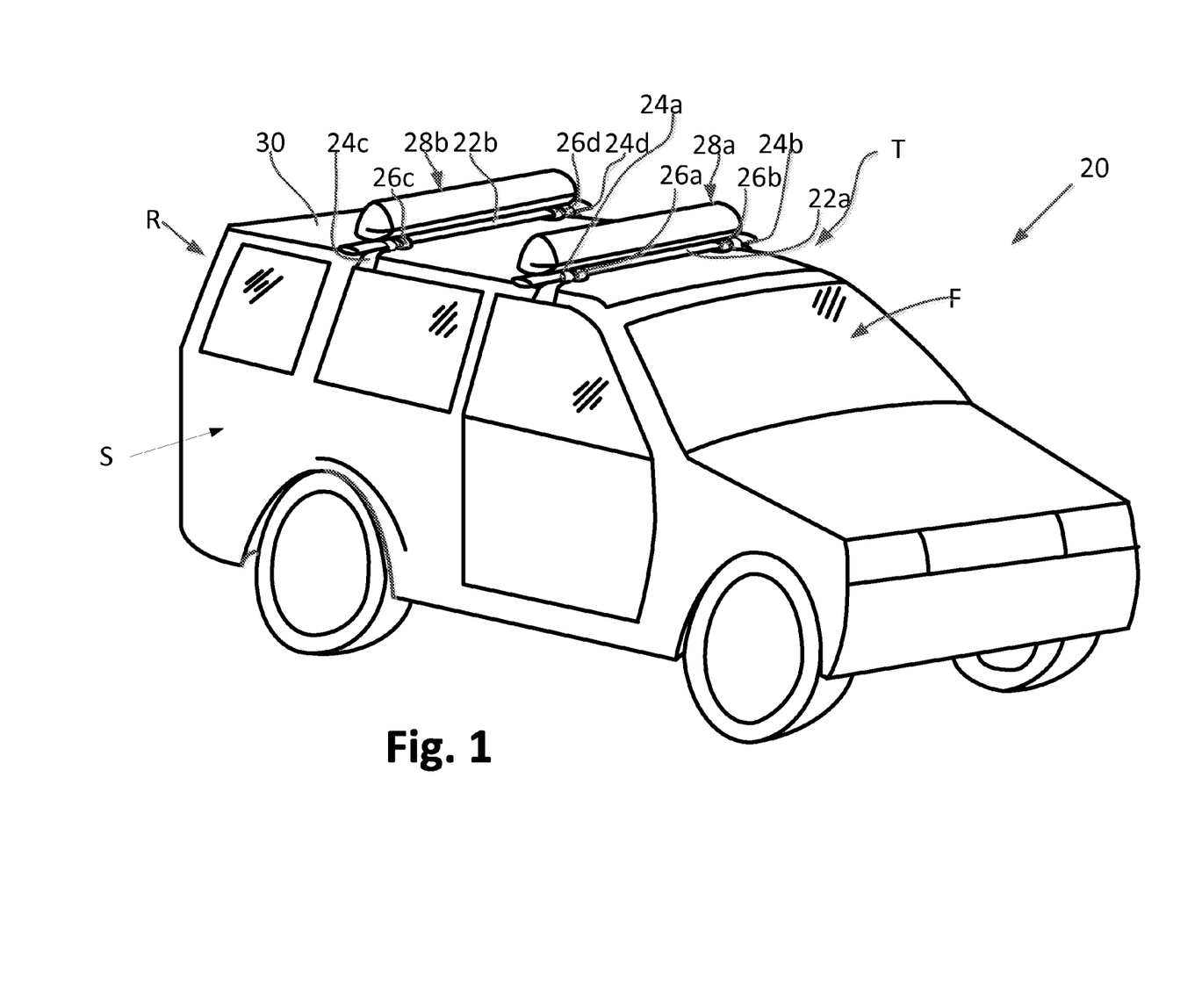
FIG. 1 is a front angle perspective view of the device of the disclosure affixed over the front and rear ski rack units on the roof rack attached to the vehicle.
Figure 2:
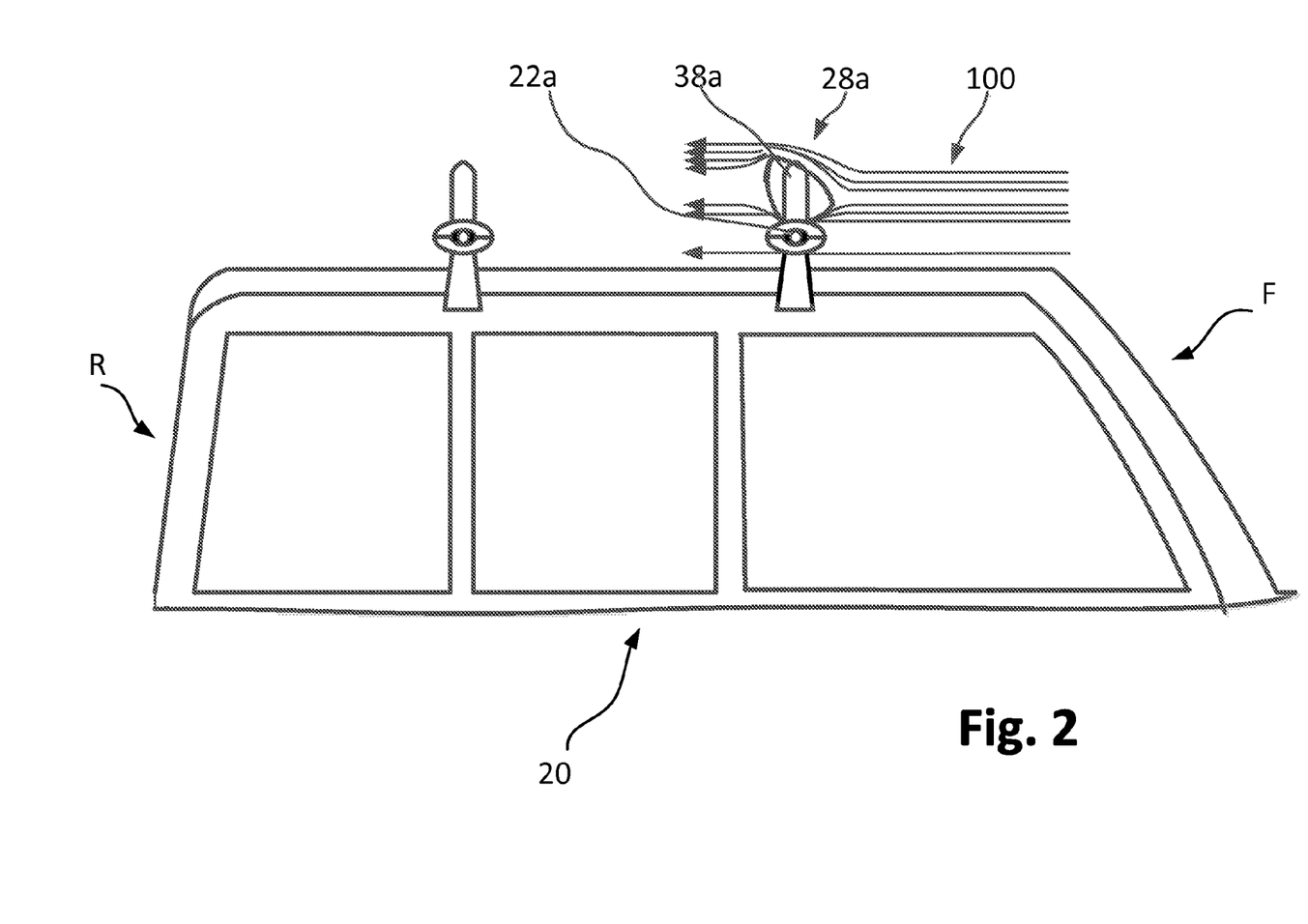
FIG. 2 is a side partially sectional view depicting the device of the disclosure as mounted on the front and ski rack and direction of an oncoming air flow perceived by the device.
Figure 3:
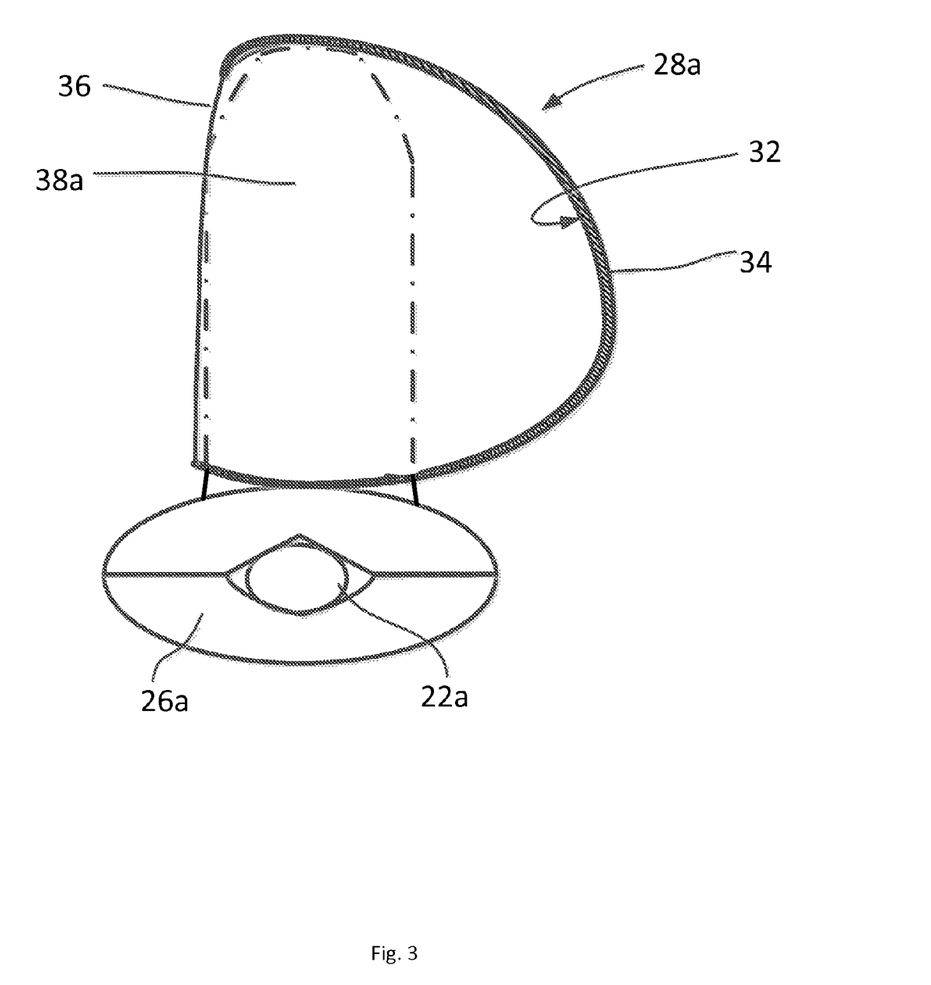
FIG. 3 is an expanded cross-sectional side view of the device of FIGS. 1 and 2 as mounted to an attachment member of a ski rack unit.
Figure 4:
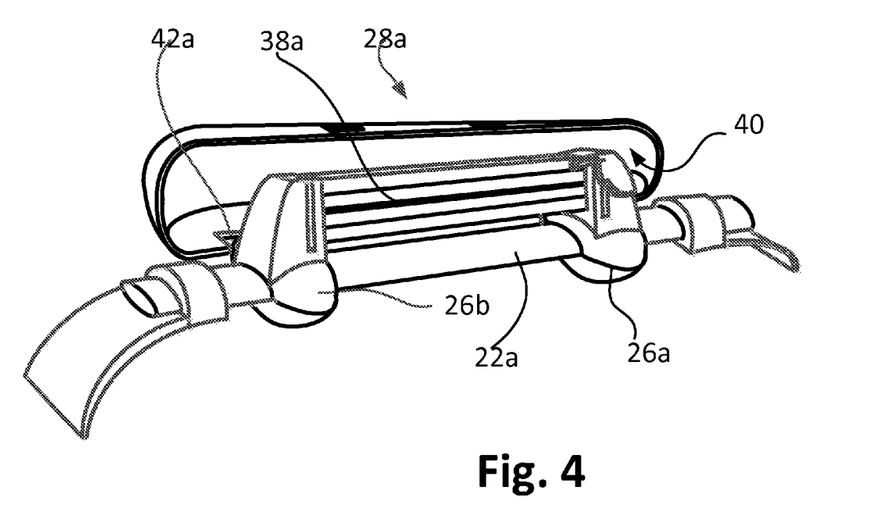
FIG. 4 is a rear angle perspective view with the device shown directly in front of a ski rack unit.
Figure 5:
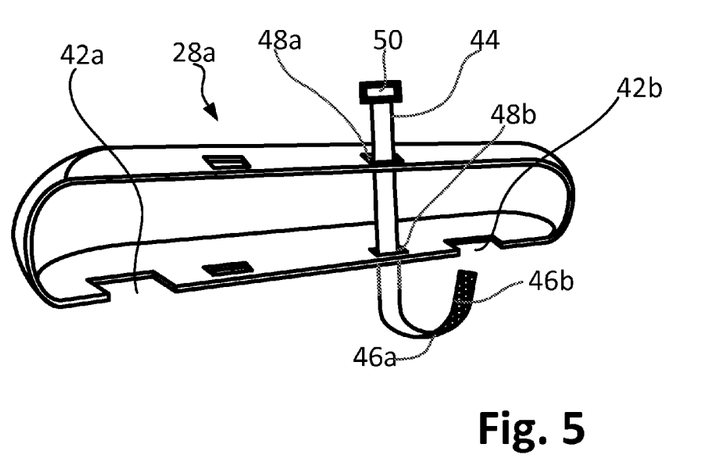
FIG. 5 is a rear angle view illustrating an example of a mechanism for securing the device to the ski rack unit.
Figure 6:
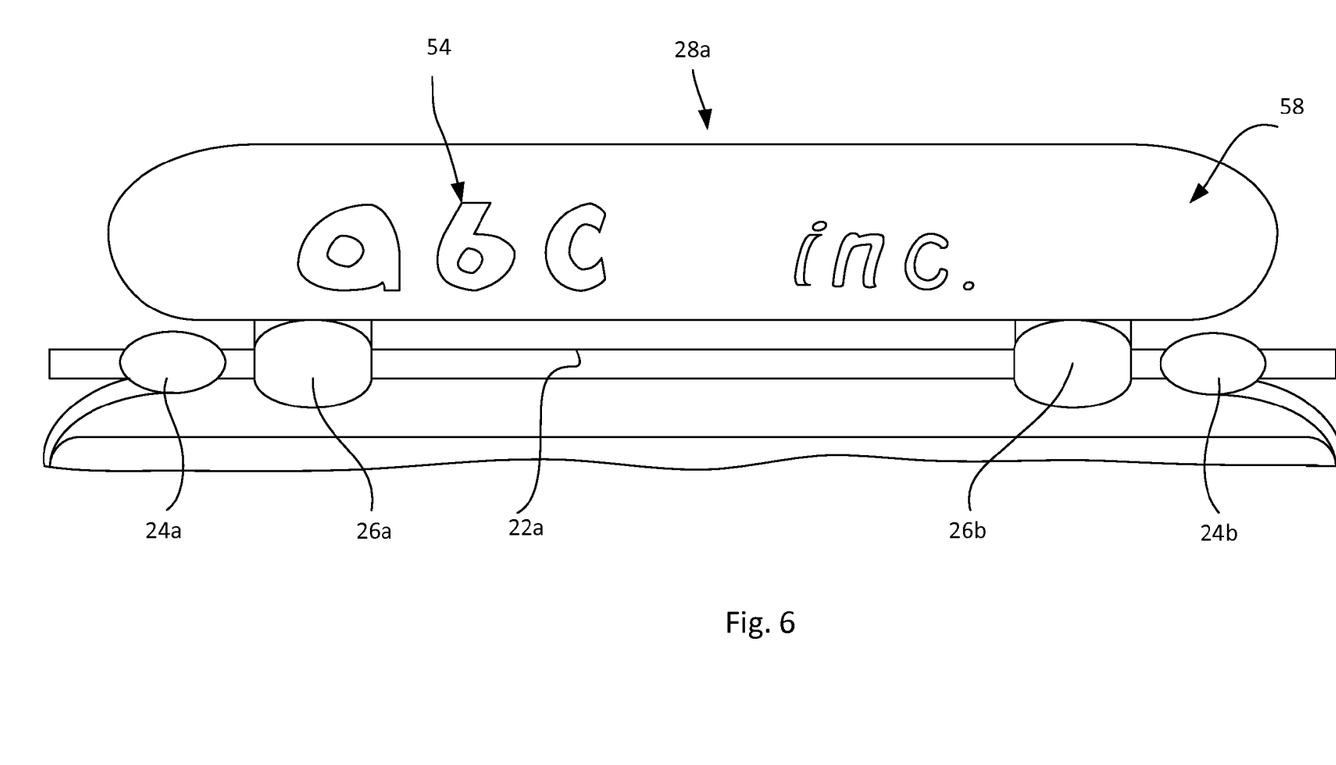
FIG. 6 is a front view of the device.
Figure 7A:
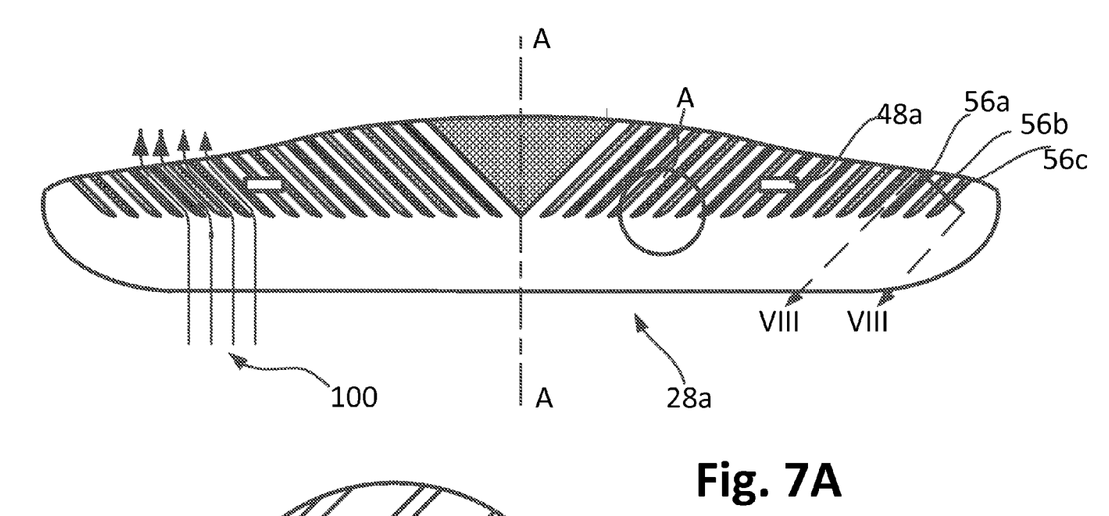
FIG. 7A is a top view of the device.
Figure 7B:
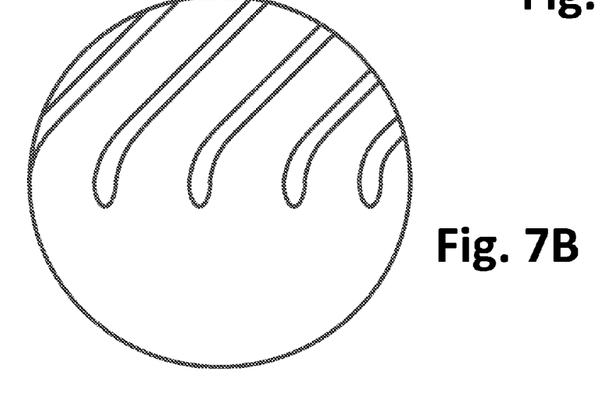
FIG. 7B is an area A of FIG. 7A shown on a larger scale.
Figures 8, 9:
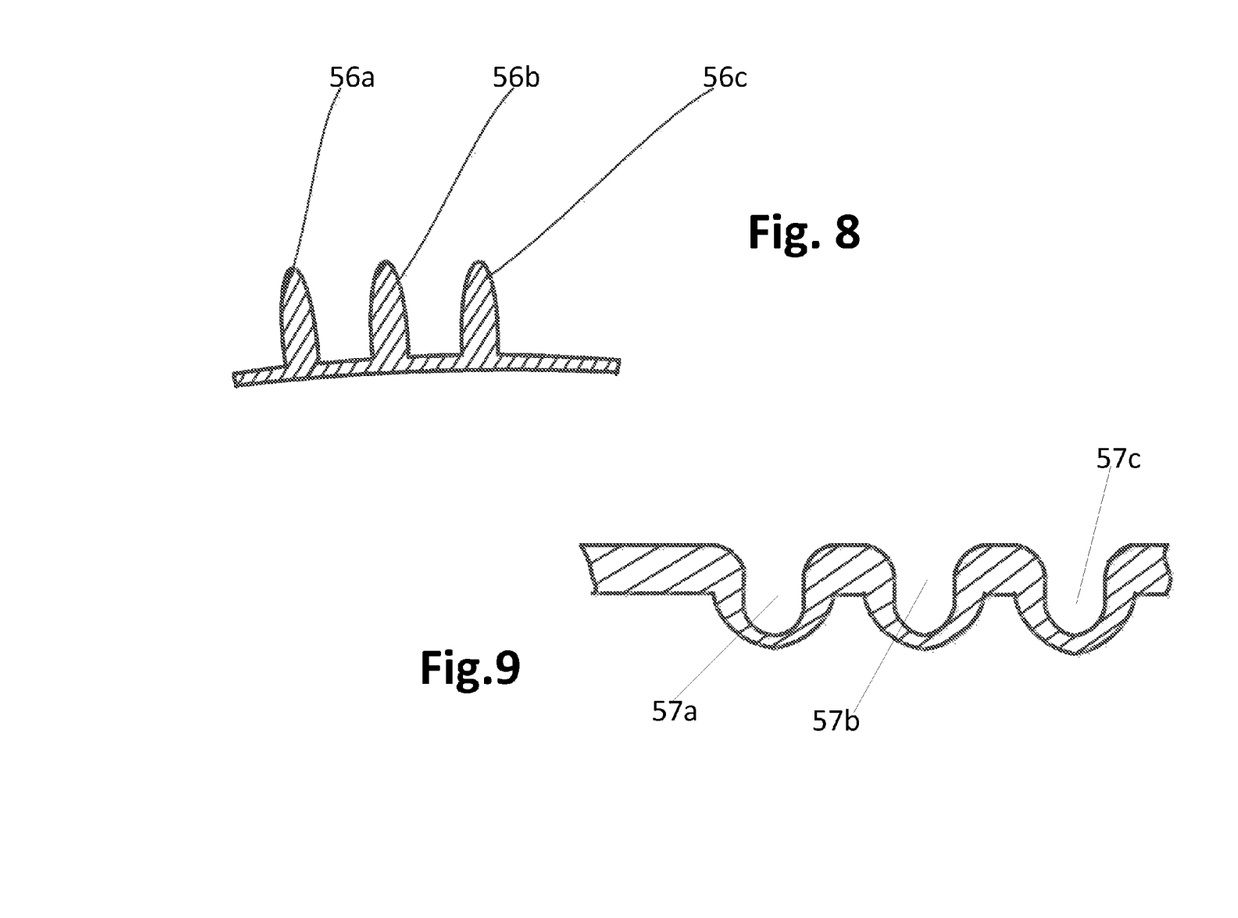
FIG. 8 is a sectional view along line VIII-VIII of FIG. 7A.
FIG. 9 is a modification of air-guiding elements formed on the front side of the device in the form of grooves.

The proposed aerodynamic drag and noise reduction device for a vehicle roof rack will now be described with reference to the accompanying drawings, wherein FIG. 1 is a front angle perspective view of the device affixed to the front and rear ski rack units, as shown mounted on the roof rack attached to the vehicle. FIG. 2 is a side partially sectional view depicting the device of the disclosure as mounted on the front and ski rack. FIG. 3 is an expanded cross-sectional side-view perspective of the device of FIGS. 1 and 2 as mounted to an attachment member of a ski rack unit. FIG. 4 is a rear angle perspective view of the device depicted directly in front of a ski rack unit. FIG. 5 is a rear angle view illustrating an example of a mechanism for securing the device to the ski rack unit. FIG. 6 is a front view of the device. FIG. 7A is a top view of the device. FIG. 7B is an area A of FIG. 7A shown on a larger scale. FIG. 8 is a sectional view along line VIII-VIII of FIG. 7A. FIG. 9 is a modification of air-guiding elements formed on front side of the device in the form of grooves.

Existing article carriers, e.g., ski racks, have a less than optimal aerodynamic profile by virtue of their essentially vertical presentation and location above the plane of the cross bars. Air passing above, below, and around roof mounted article carriers, e.g. ski racks, becomes turbulent, increasing drag and noise.

FIG. 1 shows a vehicle, e.g., a sport utility vehicle 20 equipped with proposed aerodynamic drag and noise reduction devices 28a and 28b installed over vehicle roof rack article carriers, e.g. ski racks, which are obscured in FIG. 1. It should be understood that the apparatus and method may and will be employed with other types of vehicles (e.g. sedans, wagons, vans).

In FIG. 1, reference numerals 22a and 22b designate front and rear crossbars, respectively, which are secured horizontally above a vehicle roof 30 by towers 24a, 24b, 24c, and 24d. Front and rear ski racks (not visible in FIG. 1) attach respectively to the front and rear crossbars 22a and 22b via mounting feet 26a and 26b, and 26c and 26d, respectively. Since both devices 28a and 28b are identical, only one of them, the device 28a will further be considered.

The device 28a of the disclosure comprises a vehicle roof rack mounted fairing that decreases aerodynamic drag, wind noise, and damage to ski racks from road debris and the elements. The device 28a described herein will typically be used in connection with transportation vehicles having a front (F), rear (R), top (T) and opposing sides (S) (only one of which is designated).

FIG. 2 shows aerodynamic profile of the disclosed device 28a installed in a position that improves aerodynamic performance by directing airflow 100 around article carriers, e.g. ski racks 38a, affixed to the vehicle's cross bars 22a. As air flows from the front F to rear R of the vehicle 20 and toward the forward presenting surface of the disclosed device, it is directed around the device 28a and thus the article carrier, e.g. ski rack 38a, in a manner that increases laminar flow and decreases aerodynamic drag.

Referencing FIG. 3, in a cross section, for example, the device 28a is shown affixed over a ski rack 38a, which is attached by an attaching mechanism. e.g., an attaching member foot 26a, to acrossbar 22a. In the vehicle movement direction, the proposed device 28a may have a profile selected from a smooth horizontal parabolic shape with an internal concave surface 32. The term "parabolic" herein is intended to provide a general description of the general shape of the leading edge and is not intended to limit the disclosure to the limited mathematical definition of a parabola. Field tests conducted by the applicants showed that the semi-symmetrical leading edge airfoil profile, as shown in FIGS. 2 and 3, is most favorable from the viewpoint of aerodynamic drag and noise reduction. The particular shape of the leading and trailing edge portions or sides 34 and 36, respectively, of the device 28a may vary depending on the particular application and placement on the vehicle.

Referring to FIG. 4, in this illustrative configuration, the ski rack 38a mounts to the crossbar 22a by a pair of attachment mounting feet 26a and 26b. The hollow parabolic-shaped interior 40 of the device 28a is sufficient to accommodate the article carrier, e.g. ski rack, 38a and preferably has dimensions that allow the interior 40 of the device to tightly envelop the article carrier, e.g., ski rack 38a when the device 28a is mounted to it.

Referencing FIG. 5, in one modification, the bottom edge has notches 42a and 42b to accommodate the attachment members 26a and 26b of a ski rack 38a, i.e., the feet of a ski rack that secures the ski rack 38a to the crossbar 22a (FIG. 4). The notches may be approximately 3.5 mm by 4 mm each. Other configurations that will be obvious to those skilled in the art may be necessary to accommodate differences in the method of attachment (e.g., some racks attach by sliding into channels found in certain crossbars and thus do not require feet). Spacing of the feet 26a and 26b of the ski rack 38a (FIG. 4) and the clearance, if any, between the cross bar 22a and the ski rack 38a (FIG. 4) also may vary from one model to the other. In one version, the device 28a may include several internal vertical support ribs for stability (not depicted).

Referencing FIG. 5, the disclosed device 28a fits over and encompasses an article carrier, e.g., ski rack 38a (FIG. 4), is lightweight and is easily attachable and removable by a single person. According to one or several aspects, as shown in FIG. 5, the attachment mechanism may consist of two material straps (only one, a strap 44, is depicted for illustrative purposes) that fit through slots such as slots 48a and 48b at the top and bottom of the device 28a, respectively, and are secured manually.

In one configuration, a strap 44 with hooks-and-loops fasteners registered by Velcro Company under trademark Velcro® is threaded through the upper and lower slots 48a and 48b. The device 28a is then placed over the ski rack 38a (not shown in FIG. 5) from the forward facing direction so that the portion of the strap 44 between the two slots 48a and 48b is positioned against the anterior or forward-facing position of the ski rack 38a (FIG. 4). The lower portion of the strap below the lower slot 48b is then looped up and through the buckle 50 attached to the upper portion of the strap 44. The strap 44 is then looped back down onto itself along the posterior surface of the article carrier, e.g., ski rack 38a (not shown in FIG. 5) where the strap 44 is secured in a device securing position by contact of the hooks and loops surfaces 46a and 46b. Similarly, removal of the device 28a is affected by releasing the surfaces 46*a* and 46*b* and pulling the device forward and away from the article carrier, e.g., ski rack 38*a* (FIG. 4). It is understood that the strap-type attachment is shown only as an example and that various attachment systems will be obvious to those skilled in the art.

Referencing FIG. 6, by virtue of its design and location, the exposed front facing surface 58 of the disclosed device 28*a* can also be used for graphic information such as advertising, brand or logo placement, or can accommodate other graphic designs. FIG. 6. shows one such version of a logo 54 as placed on the disclosed device forward facing surface 58.

Since the device of the invention comprises a thin-walled container, at high speed of movement of the vehicle, the device may produce aerodynamic noise. In order to attenuate this noise, the device may be provided with specially profiled air-flow direction strips or channels. Referencing FIG. 7A, according to one or several aspects, the disclosed device may include tapered diagonal airflow deflectors 56*a*, 56*b*, 56*c*, etc. on the lower and/or upper portions. For example, in one modification, looking at the proposed device from the front of the vehicle, one can see the aforementioned airflow deflectors 56*a*, 56*b*, 56*c*. etc. as tapered diagonal raised strips. As can be seen from FIG. 7B, which is a view on the air-intake ends of the deflectors in encircled area A of FIG. 7A shown on a larger scale, the air-intake ends of the deflectors may be slightly flared and curved in order to facilitate entrance of the air flow. The angle of inclination of the air-guiding deflectors to the longitudinal direction of the vehicle roof can be more specifically defined as an angle formed by the tangents to the curved profiles of the airflow deflectors 56 in a view from the front side of the leading edge of the proposed device 28*a*. It can be seen from FIG. 7A that the airflow deflectors have symmetrically opposite directions relative to the central vertical axis A-A of the device 28*a*.

It was found experimentally by the applicants that appreciable noise reduction effect can be achieved when the aforementioned angle is at least in the range of 15 to 45 degrees and the raised strips are symmetrically spaced at least 4 mm apart, essentially parallel to each other, and spanning the length of the upper portion of the device 28*a*. As air streams 100 flow around the device 28*a*, the airflow deflectors 56*a*, 56*b*, 56*c*, etc. produce vortices of equivalent strength that create a steady symmetric wake flow that reduces drag.

FIG. 8 is a cross section along line VIII-VIII of FIG. 7 which is perpendicular to the direction of the raised strips 56*a*, 56*b*, 56*c*, etc. It can be seen that the raised strips that form airflow deflectors, etc., comprise vertical ribs with rounded tips that project from the surface of the device. FIG. 9 is another modification of air-flow guiding channels that are defined by recesses 57*a*, 57*b*, 57*c*, etc. formed in the surface of the device, e.g., by molding during the manufacture of the device 28*a* (FIG. 7A) or by plastic deformation, if the devices are made from thin-walled metal sheets.

The disclosed device 28*a* (e.g. FIG. 7A) can be comprised of thermoplastics, metals, or other suitable materials that are impact resistant and weather resistant through a wide range of temperatures and conditions. Moreover, the device can be comprised of different colors, surface textures and other embodiments.

The disclosure mitigates the loss of fuel efficiency by reducing aerodynamic drag produced by vehicle roof mounted article carriers, e.g. ski racks, significantly reduces noise and whistling, protects the ski rack from road debris and the elements, namely sun damage to the ski racks plastic and other flexible components, is stable while the vehicle is in motion, is easily removable, and is aesthetically pleasing.

We claim:

1. An aerodynamic drag and noise reduction device for a vehicle roof rack article carrier comprising: a hollow container having a smoothly rounded closed leading side, an open rear side, and an interior portion for accommodating the vehicle roof rack article carrier, notches for accommodating attachment members of the vehicle roof rack article carrier, and an attaching mechanism for attachment of the device to the vehicle roof rack, wherein the smoothly rounded closed leading side has a parabolic shape with an internal concave surface.

2. The aerodynamic drag and noise reduction device of claim 1, wherein the attaching mechanism for attachment of the device to the vehicle roof rack comprises at least one slot made in the device, at least one strap threaded through the slot, and securing means for securing the strap in a device securing position.

3. The aerodynamic drag and noise reduction device of claim 1, wherein the securing means comprise hooks-and-loops fasteners.

4. The aerodynamic drag and noise reduction device of claim 2, wherein the securing means comprise hooks-and-loops fasteners.

5. The aerodynamic drag and noise reduction device of claim 1, wherein the vehicle roof rack article carrier is a ski rack carrier.

6. The aerodynamic drag and noise reduction device of claim 2, wherein the vehicle roof rack article carrier is a ski rack carrier.

7. The aerodynamic drag and noise reduction device of claim 4, wherein the vehicle roof rack article carrier is a ski rack carrier.

8. The aerodynamic drag and noise reduction device of claim 1, wherein the smoothly rounded closed leading side is provided with tapered diagonal airflow deflectors having curved profiles and an angle of inclination to the longitudinal direction of the vehicle roof.

9. The aerodynamic drag and noise reduction device of claim 8, wherein the angle of inclination is defined by tangents to the curved profiles of the tapered diagonal airflow deflectors and varies in the range of 15 to 45 degrees.

10. The aerodynamic drag and noise reduction device of claim 9, wherein the tapered diagonal airflow deflectors have symmetrically opposite directions relative to the central vertical axis of the device.

11. The aerodynamic drag and noise reduction device of claim 8, wherein the tapered diagonal airflow deflectors are channels formed by vertical ribs with rounded tips that project from the surface of the device.

12. The aerodynamic drag and noise reduction device of claim 9, wherein the angle of inclination is defined by tangents to the curved profiles of the tapered diagonal airflow deflectors and varies in the range of 15 to 45 degrees.

13. The aerodynamic drag and noise reduction device of claim 9, wherein the tapered diagonal airflow deflectors have symmetrically opposite directions relative to the central vertical axis of the device.

14. The aerodynamic drag and noise reduction device of claim 8, wherein the tapered diagonal airflow deflectors are channels formed by recesses formed in the surface of the device.

15. The aerodynamic drag and noise reduction device of claim 14, wherein the angle of inclination is defined by tangents to the curved profiles of the tapered diagonal airflow deflectors and varies in the range of 15 to 45 degrees.

16. The aerodynamic drag and noise reduction device of claim 15, wherein the tapered diagonal airflow deflectors have symmetrically opposite directions relative to the central vertical axis of the device.

17. The aerodynamic drag and noise reduction device of claim 1, wherein the smoothly rounded closed leading side carried a graphic information.

18. The aerodynamic drag and noise reduction device of claim 11, wherein the smoothly rounded closed leading side carries a graphic information.

19. The aerodynamic drag and noise reduction device of claim 14, wherein the smoothly rounded closed leading side carries a graphic information.

\* \* \* \* \*